Patented Nov. 20, 1951

2,575,347

UNITED STATES PATENT OFFICE 2,575,347

METALLO ORGANIC COMPOUNDS

Charles A. Kumins, Brooklyn, and James R. McNesby, New York, N. Y., assignors to Interchemical Corporation, New York, N. Y., a corporation of Ohio No Drawing. Application July 14, 1949,
Serial No. 104,818

7 Claims. (Cl. 260—414)

This invention relates to new metallo-organic compounds containing iron, particularly useful as pigments, and to their manufacture.

Inorganic pigments of the iron oxide type, having varying degrees of hydration, have been used in the past because they are cheap and light resistant, even though in general they are dirty opaque pigments in the brown and red range. Hematites, the naturally occurring oxides, have been used as red pigments; while ochres, the naturally occurring hydrated oxides, have been widely used despite their dirty golden yellow color. Ochres have been prepared synthetically on a large scale, and even fully hydrated ferric hydroxide has been used as a pigment. To sum up, ferric oxides and hydroxides both of the naturally occurring and synthetic varieties, with no hydration to complete hydration, have been used for cheap pigments where dirty shades of reddish and brownish colors have not been objectionable and where lightfast, opaque inorganic colors of a limited color range have been suitable.

Attempts have been made to combine the light resistance of iron oxide pigments with the transparency and color range of organic pigments with very limited success. Efforts have also been made to develop transparent iron oxide pigments which could be recovered in the form of dry powders within the pigment particle size range, approximately 0.01-2 microns, but such attempts have been uniformly unsuccessful for the reason that the resultant particle sizes have been so great that opacity rather than transparency has resulted. All things being equal, the smaller the particle size of a pigment, the more transparent that pigment is.

Since it had been found impossible to make transparent iron oxide pigments in dry pigmentary form, research tried to solve this problem by circumventing the usual drying step which resulted in opaque, dirty shade, pigmentary aggregates. One method has recently been patented whereby hydrophilic colloidal ferric hydroxide precipitate is mixed with an aqueous emulsion of an alkyd resin dissolved in a water-immiscible volatile organic solvent to form a colloidal dispersion, which latter is subjected to azeotropic distillation to remove water and transfer the pigment to the hydrophobic alkyd resin phase. A composition comprising a colloidally subdivided, substantially aggregate free iron oxide pigment colloidally dispersed in an alkyd resin is said to be obtained, thin layers of which appear deep reddish brown in reflected light and yellowish in transmitted light. It is necessary so to flush the precipitated ferric hydroxide to yield a pigmentary dispersion because it has been found impossible, so far as the literature reveals, to obtain a dry iron oxide the particle size of which can be controlled to yield a transparent pigment.

Compounds of iron and other heavy metals with fatty, naphthenic and resin acids, generally termed soaps, are well known. They have been used for waterproofing, mordanting; preparing emulsions, lubricants, floor waxes, polishing compounds; in dry cleaning; and as driers for paints, varnishes and lacquers, among other things. But no heavy metal soap has been used as a pigment, so far as the literature has revealed. Those soaps which are known have been made in several ways: By heating or fusing metal oxides or salts with free acids; by double decomposition resulting from the reaction between aqueous solutions of metal salts and alkali metal salts of saponifiable acids; aluminum soaps have been made by reacting wet, gelatinous aluminum hydrate with saponifiable acids in the presence of 0.01-2% by weight, based on the 75-99% water wet gelatinous aluminum hydrate, of a volatile or fixed alkali catalyst at room or lower temperatures, the reaction being accelerated by mild heat; and, finally, hydroxy metal salts have been made by reacting an aqueous alkaline solution of an alkali salt of a non-aromatic (naphthenic) acid with an aqueous solution of a heavy metal salt, presumably at room temperature. But, to repeat, prior art soaps, however made, have never been used as pigments, for the reason that none has yet been disclosed which has transparent, color yielding properties.

We have invented a method for making new iron compounds, particularly useful as pigments, whereby precipitated ferric hydroxide is reacted with an acid of the group consisting of naphthenic acids and fatty acids having at least four carbon atoms, or ammonium soaps thereof, in a reaction medium comprising an organophile-hydrophile compound under such conditions that new ferro-organic pigments are formed. The pigment formation may be visualized as the reaction of one mole of such acid or ammonium soap with one mole of ferric hydroxide to form a dibasic soap, and the reaction of one mole of the latter with two moles of ferric hydroxide to form a ferroxy chain unit of alternating Fe and O atoms having two hydroxyl groups at each terminus and having an acid radical of the group indicated attached to the central Fe atom. Ferroxy pigment formation is visualized as the polymerization of the above-indicated ferroxy chain units through the terminal hydroxyl groups. In this type of statistical reaction, we may also react lesser amounts of such acid or ammonium soap with ferric hydroxide to form similar polymers having more alternating Fe and O atoms and fewer substituted acid radicals.

In making our new iron pigments, ferric hydroxide is precipitated from an aqueous solution of a ferric salt by means of fixed or volatile alkali. The ferric hydroxide slurry formed is reacted with an acid of the group consisting of naphthenic acids and fatty acids having at least four carbon atoms, or an ammonium soap thereof, with vigorous stirring in the presence of an organophile-hydrophile compound, and heat is applied with continued stirring. As the temperature rises rapidly to the boiling point, the color of the slurry changes from dirty brown to deep maroon (with evolution of ammonia when an ammonium soap is used), and, on continued boiling, pigment finally separates in the mother liquor as small black curds. The pigment is separated from the mother liquor, washed with water, heated to dryness, and pulverized to pigmentary fineness.

When an ammonium soap is used in the reaction, the reaction time requires approximately three hours for pigment formation. When a free acid is used in the reaction, pigment formation may be completed in approximately 35 to 90 minutes.

The molar ratio of acid or ammonium soap to ferric hydroxide may be varied considerably. The minimum amount of acid or ammonium soap reacted with ferric hydroxide approaches zero. Of course, when no acid or soap is reacted with ferric hydroxide, the end product will be ferric hydroxide and its dehydration products. As the amount of acyl substituent in our polymeric products increases to a maximum of 1 mole per 3 moles of iron, their solubility in organic solvents and transparency increases. For maximum transparency, a molar ratio of approximately 0.8–1.0 acyl substituent to 3.0 moles Fe is preferred. Products with smaller proportions of acyl substituent are less transparent and less soluble to insoluble in organic solvents. All of our polymeric products are water insoluble.

Four or more carbon acids of the fatty series and naphthenic acids, or mixtures, or ammonium soaps thereof may be used, the higher fatty and naphthenic acids being more attractive since they are more readily available.

Among the more readily procurable fatty acids which we use in the free form or as ammonium soaps, are stearic, palmitic, lauric and ethyl hexoic. It is not necessary to use pure fatty acids; on the contrary, it is generally more satisfactory to use commercial mixtures. Of these we especially prefer coconut fatty acids. While many of the fatty acids in mixtures are saturated, many of them also contain unsaturated constituents, such as ricinoleic in castor oil fatty acids and oleic in coconut oil fatty acids. We have found these to be equally as satisfactory as the saturated components. At a matter of fact, substituted fatty acids, provided their substituents are not such as to vitiate the objects of our invention, are also equally satisfactory. Among the suitable substituted fatty acids which we have used are the chlorinated oleic acid and those of chlorinated cottonseed oil. Again, ricinoleic acid, 12-hydroxy substituted 9-octadecenoic acid, yields a valuable product.

We have also found that naphthenic acids may similarily be used to give equally satisfactory products. The similarities of naphthenic and fatty acids are indicated by Carelton Ellis' "The Chemistry of Petroleum Derivatives," volume 2, 1937, pages 1110–1111. There it is pointed out that naphthenic acids containing up to six carbon atoms are aliphatic, those possessing seven to twelve carbon atoms are monocyclic compounds, those having more than twelve carbon atoms are dicyclic, that the main ring system in the cyclic acids is a cyclopentane ring, and that the carboxyl group is predominately on the end of an alkyl side chain attached to the single or a double ring structure. We have used commercial mixtures of naphthenic acids and have found no appreciable differences in our products obtained from the lower acid number higher molecular weight ones as compared with the higher acid number lower molecular weight ones.

An essential component of the reaction medium is an organophile-hydrophile compound. It has been found necessary to include such a compound, since without it such reaction products as are recovered do not have suitable transparency and solubility characteristics, which suggests that the pigment-forming reaction does not go to completion without this component. All suitable organophile-hydrophile compounds have been chosen because of their physical characteristics, since they do not enter into reaction. Their presence insures that the ferric hydroxide is wetted, and that reaction with acid or ammonium soap is facilitated by bringing together the organophilic acyl radical and the hydrophilic ferric hydroxide. All such compounds found useful have at least four carbon atoms per molecule and have one or more water solubilizing groups. It is necessary that they be liquid at approximately 102° C., the reflux temperature, and that they be condensible at this temperature by a water-cooled condenser, so that they are not evaporated from the reaction medium. Any polar organic solvent having these indicated physical characteristics may be used. We have used such alcohols as isobutyl, 2-ethyl-hexyl, and octyl; such esters as octyl acetate and hexaethyl tetraphosphate; such a ketone as amyl methyl ketone; such an ether as the ethyl, butyl diether of glycol; and such amines as diamyl and triethylamines; all with satisfactory results. For the sake of brevity in describing and claiming our invention, we shall refer to a compound or mixture of compounds having the indicated requisite properties as "organophile-hydrophile material."

Analytic data indicates that our new pigments are giant molecules, are not mixtures, and do not form colloidal solutions in solvents as soaps do. We have found by quantitative analysis that our pigment polymers have up to one acid radical corresponding to our theoretical ferroxy chain unit having three iron atoms. No depression of the freezing point of a benzene solution, used to attempt to determine the molecular weight of representative pigments, was obtained. Solutions of pigments in hydrocarbon solvents did not exhibit a Tyndall effect when observed through the ultramicroscope as colloidal solutions would have. Repeated precipitations from toluene solutions by means of ethyl acetate and re-solutions in toluene were accompanied by no change in composition of these pigments, as one would have expected from mixtures.

The following are typical examples of our invention:

Example 1

126 grams of ferric chloride hexahydrate (0.465 mole) was dissolved in 250 grams of water. 350 grams of ice was added and the whole transferred to a two-liter, three-necked flask fitted with a high-speed stirrer and reflux condenser. 135 mls. concentrated ammonium hydroxide solution was then allowed to drop into the ferric chloride solution with stirring. The ammonia was in slight excess over that required to precipitate ferric hydroxide and to form the ammonium soap of acid to be added. After the ammonia was added, 33 grams of coconut fatty acids having an acid number of 256.8 (0.155 mole OH−) dissolved in 15 mls. isobutanol and 5 mls. ethyl hexanol was added rapidly. The contents of the flask was stirred for 15 minutes, then heat was applied to bring to a boil within one-half hour. As the reaction proceeded, the color of the slurry changed from dirty brown to deep maroon, and ammonia was evolved. Finally, the pigment separated from the mother liquor as small black curds. The pigment was filtered off and washed several times with water. A 73 gram yield of product (100% of theory) was obtained after drying at 70° C. The pigment obtained by micropulverizing the dried yield was soluble in both aliphatic and aromatic hydrocarbon solvents. When incorporated in suitable vehicles such as nitrocellulose, alkyd and oleoresinous types, films varying in color from a beautiful transparent gold to a rich transparent deep maroon, depending upon the concentration of pigment used, were obtainable. The dried films, however, contained the pigment in a form not extractable by hydrocarbon solvents.

Example 2

The procedure of Example 1 was repeated, substituting an equivalent amount of palmitic acid for the coconut fatty acids. A pigmentary powder was obtained, producing colors of approximately the same range as in Example 1.

Example 3

126 g. ferric chloride hexahydrate (0.465 mole) was dissolved in 350 mls. water and 250 g. ice was added. To this solution were added 35 g. coconut fatty acids having an acid number of 256 (0.160 mole OH−), 15 mls. isobutanol and 5 mls. ethyl hexanol. While this mixture was being rapidly stirred, 135 mls. concentrated ammonium hydroxide solution was dropped slowly into the reaction flask which was equipped with a reflux condenser. After all the ammonia had been added, the reaction flask was heated rapidly and allowed to reflux until small reddish black curds separated out. This took approximately 3½ hours. The pigment curds were filtered off, washed free of salts with water and dried at 85° C.

Example 4

The procedure of Example 3 was repeated, substituting 250 g. water at room temperature for ice.

Example 5

126 g. ferric chloride hexahydrate (0.465 mole) was dissolved in 600 mls. water in a 2-liter, 3-necked flask fitted with a high-speed stirrer and reflux condenser. 120 mls. concentrated ammonium hydroxide was then slowly added dropwise. The flask contents was heated to reflux temperature, and the following mixture added rapidly:

20 mls. concentrated ammonium hydroxide
35 g. coconut fatty acids (0.160 mole)
15 mls. isobutanol
5 mls. ethyl hexanol Refluxing and high-speed stirring were continued until black curds appeared. The pigment was filtered, washed and dried at 85° C.

Example 6

The procedure of Example 3 was repeated, substituting 20 mls. octyl acetate for the ethyl hexanol and isobutanol.

Example 7

The procedure of Example 5 was repeated, substituting 25 mls. amyl methyl ketone for the isobutanol and ethyl hexanol.

Example 8

To 315 g. ferric chloride hexahydrate (1.465 mole) dissolved in 600 mls. water in a 2-liter, 3-necked flask equipped with a reflux condenser and high-speed stirrer were added 111 g. stearic acid (0.391 mole), 12.5 mls. n-octanol, and 37.5 mls. isobutanol. 335 mls. concentrated ammonium hydroxide was slowly added dropwise with stirring. After the ammonia was added, the flask was heated to reflux temperature rapidly with continued stirring, the resulting pigment being filtered off when the curd had developed. It was washed and dried.

Example 9

The procedure of Example 8 was repeated, substituting 50 mls. ethyl butyl di-ether of glycol for the octanol and isobutanol.

Example 10

The procedure of Example 3 was repeated, substituting 32 g. ethyl hexoic acid (0.222 mole) for the coconut fatty acids.

Example 11

The procedure of Example 9 was repeated, using 105 g. lauric acid (0.524 mole) instead of stearic acid.

Example 12

315 g. ferric chloride hexahydrate was dissolved in 600 mls. water at room temperature, 300 g. ice was added, followed by 126.5 g. castor oil fatty acids having an acid number of 177.1, 37.5 mls. isobutanol, 12.5 mls. ethyl hexanol and 300 mls. of concentrated ammonium hydroxide, the last-named added dropwise with stirring. The mixture was rapidly heated under reflux with continued stirring, and refluxed for 2 hours until the pigment curd broke. The pigment was filtered off, washed and dried overnight at 75° C.

Example 13

427 g. ferric chloride solution, 42° Baumé, was diluted to 700 mls. with water at room temperature, 300 g. ice was added, followed by 102.2 g. naphthenic acid having an acid number of 218.5, 50 mls. of a 1:3 by volume mixture of ethyl hexanol:isobutanol, and 350 mls. ammonium hydroxide (28% NH₃). The mixture was rapidly heated under reflux with stirring, and refluxed for 2 hours until the pigment curd broke. The pigment was filtered off, washed and dried at 65° C. The naphthenic acid used had viscosity at 100° F. of 300 S. S. U., a specific gravity of 0.98 at 60° F., and a distillation range at 10 mm. from 308 to 445° F.

Example 14

The procedure of Example 12 was repeated, using 93.5 g. of a naphthenic acid having an acid number of 238.6, a viscosity of 227 S. S. U. at 100° F., a specific gravity of 0.973 at 60° F., and a boiling range, the initial boiling point of which is 320° F., and the 90% over point of which is 905° F. A pigment was obtained, producing colors of approximately the same range as in Example 1.

Example 15

Into a two-liter, three-necked flask fitted with a high-speed stirrer and reflux condenser was added 171 g. ferric chloride solution (44% FeCl₃) diluted to 520 mls. with water. Then 20 mls. of a 1:3 ethyl hexanol:isobutanol mixture and 30 grams coconut fatty acids (acid No. 260) was added. Stirring was commenced and a solution of 95 mls. 28% NH₄OH in 95 mls. water was added slowly over a 5 minute period. The alkali was the stoichiometric equivalent of the ferric chloride, so that all the iron was precipitated as ferric hydroxide. Thereafter heat was applied to bring the reaction mix to refluxing, which was continued for 35 to 45 minutes, until reaction was completed. The resulting pigment was filtered, washed free of NH₄Cl, and dried at 75° C.

Example 16

The procedure of Example 1 was repeated, substituting 56.5 grams NaOH in 200 mls. water for the ammonia solution of Example 15. No appreciable difference was observed.

Example 17

The procedure of Example 15 was repeated, substituting for the coconut fatty acid therein 50 g. of hydrogenated castor oil fatty acid (acid No. 178). The reaction was completed within one hour.

Example 18

A 427 g. ferric chloride solution (44% FeCl₃) was diluted to 750 mls. with water, and to it were added 50 mls. 1:3 n-octanol:isobutanol mixture and 56.5 g. caprylic acid. Agitation was started, and 475 mls. ammonium hydroxide solution (14% NH₃) was added dropwise over a 10 minute interval. Reaction by refluxing was completed in approximately 75 minutes.

Example 19

A 171 g. ferric chloride solution (44% FeCl₃) was diluted to 520 mls. with water and Fe(OH)₃ precipitated by the addition of a solution of 81 g. KOH in 200 mls. water. To this was then added 20 mls. 1:3 n-octanol:isobutanol mixture and 30 g. coconut fatty acid (acid No. 260). The reaction was completed after refluxing for one hour.

Example 20

A 427 g. ferric chloride solution (44% FeCl₃) was diluted to 750 mls. water. To this was added 102.2 g. naphthenic acid (acid No. 218.5) and 50 mls. of a 1:3 by volume mixture of ethyl hexanol: isobutanol. Stirring was commenced, and 475 mls. NH₄OH (14% NH₃) added over a period of 10 minutes. Reaction was completed by refluxing for approximately one hour.

Example 21

The procedure of Example 15 was repeated, substituting for the coconut fatty acids its equivalent of castor oil fatty acid (acid No. 177.1).

Example 22

A solution containing 3 moles of ferric chloride (44% solution) was diluted to 1500 mls. with water, and to it were added 120 mls. 1:3 by volume n-octanol:isobutanol mixture and 1 mole 8,9-dichlorostearic acid. Thereafter, agitation was started, and ammonium hydroxide solution (14% NH₃) added over an interval of 30 minutes in amount sufficient to precipitate all the iron as hydroxide, following which the reaction medium was refluxed to formation of pigment curd, approximately 90 minutes. The pigment was filtered off, washed free of ammonium chloride, and dried at 75° C.

Example 23

A solution of 310 lbs. FeCl₃ (40%) was diluted with 940 lbs. water, and to it was added with stirring 142 lbs. NH₄OH (28% NH₃), followed by 39.5 lbs. castor oil fatty acids (molecular equivalent 304). The mixture was heated to reflux temperature and kept boiling for 5 hours, after which the pigment was filtered off, washed, and dried at 75° C. The molar ratio of fatty acid to Fe is 1:6 in this product. This product was insoluble in organic vehicles and more opaque than comparable higher acyl content products.

Example 24

Example 23 was repeated, using half as much castor oil fatty acid. The product obtained was less transparent than that of Example 23.

Example 25

A solution of 570 lbs. FeCl₃ (38%) was diluted with 20 lbs. water, and to it was added with stirring an NH₄OH solution containing 498 lbs. NH₄OH (28% NH₃) in 600 lbs. water. Heat was applied, then 44 lbs. coconut fatty acids (acid No. 260) was added. After reflux temperature was reached, boiling was continued for 4 hours. The pigment was filtered off, washed, and dried to give a product having a molar ratio of fatty acid to Fe of 1:6.

Example 26

The procedure of Example 25 was repeated, using 22 lbs. of coconut fatty acids, to give a product having a molar ratio of fatty acid to iron of 1:12.

Example 27

The procedure of Example 25 was repeated, this time using 11 lbs. of coconut fatty acids of the same acid number to give a pigment having a molar ratio of fatty acid to iron of 1:24. It was insoluble in organic vehicles and less transparent than the product of Example 26.

Example 28

While no more than one mole of acid or ammonium soap will react with three moles of ferric hydroxide to form our ferroxy trimer, which is subsequently polymerized, this experiment was performed using 200%, 300% and 400% excess of the former (two, three and four moles), to establish our theory. The method of Example 1 was used.

| Acid | Excess Acid, Per Cent | Theoretic Fe Content | Actual Fe Content |
|---|---|---|---|
| Butyric | 100 | 52.7 | 52.5 |
|  | 200 | 52.7 | 52.0 |
| Ethyl butyric | 100 | 48.2 | 51.0 |
|  | 200 | 48.2 | 49.1 |
| Caproic | 200 | 48.2 | 47.8 |
| Caprylic | 100 | 44.8 | 46.7 |
|  | 200 | 44.8 | 44.7 |
|  | 400 | 44.8 | 45.8 |
| Capric | 100 | 41.7 | 36.3 |
|  | 200 | 41.7 | 44.2 |
| Lauric | 100 | 39.0 | 40.7 |
|  | 200 | 39.0 | 39.0 |
| Myristic | 100 | 36.6 | 36.6 |
|  | 200 | 36.6 | 39.6 |
| Palmitic | 100 | 34.5 | 36.0 |
|  | 200 | 34.5 | 36.3 |
| Stearic | 200 | 32.6 | 38.7 |

All of these products were dissolved in toluene and precipitated with ethyl acetate.

*Example 29*

A high-solids gold lacquer having the following composition by weight was formulated:

A. 5.45 Pigment (made according to the procedure of Example 1).
B. 53.5 Nitrocellulose solution ½ Sec. R. S. Nitrocellulose... 22.4
Toluol
Butyl Acetate, 30.0 } 77.6
Butyl Alcohol, 10.0
C. 8.35 Coconut oil modified alkyd resin solution, 60% in xylol.
D. 3.4 Castor oil modified alkyd resin solution, 65% in xylol.
E. $\frac{25.0}{100.0}$ Solvent
Toluol ---- 60.0
Butyl Acetate ---- 30.0
Butyl Alcohol ---- 10.0

C and D were added to B, E was then added, and A was stirred into the mixture, where it rapidly dissolved. Dried films of this lacquer yielded an attractive transparent gold surface. The pigment was not extractable by aliphatic or aromatic hydrocarbon solvents from dried films of this lacquer.

Our invention has thus made available new ferro-organic pigments in pigmentary powder form which have the light resistance of inorganic pigments, are clean in shade of variable transparency, yield films from organic coating compositions varying from light gold to deep red, are water-insoluble, and yet yield dried pigmented films from organic coating compositions from which the pigment may not be extracted by means of the organic solvents in which they may be soluble at first. Our new pigments may be readily made by a simple, efficient, inexpensive process.

The new pigments of our invention may be used with suitable vehicles, such as alkyd, nitrocellulose and oleoresinous types, for printing inks, protective and decorative coatings, and, in general, for any use requiring a clean, pigment within the indicated color range.

For such subject matter as is common to this application and our abandoned application S. N. 790,008, filed December 5, 1947, we claim the benefit of that application.

We claim:

1. As new compounds, polymers of ferric hydroxide in which hydroxyl is substituted at least in part and not exceeding one hydroxyl group per three atoms of iron by an acid radical of the group consisting of a fatty acid having at least four carbon atoms and a naphthenic acid.

2. Method of making a high molecular weight, complex iron compound which comprises reacting ferric hydroxide with a compound having the formula $R_1OR_2$, in which $R_1$ is $NH_4$ or H and $OR_2$ is an acid radical of the group consisting of a fatty acid having at least four carbon atoms and a naphthenic acid, in a reaction medium comprising an organophile-hydrophile material by heating under reflux, and separating the iron compound formed from the reaction medium, the molar ratio of acid radical to ferric hydroxide not exceeding 1:3.

3. Method of claim 2 in which castor oil fatty acids are used.

4. Method of claim 2 in which coconut fatty acids are used.

5. Method of claim 2 in which 8,9-dichlorostearic acid is used.

6. Method of claim 2 in which caprylic acid is used.

7. Method of claim 2 in which myristic acid is used.

CHARLES A. KUMINS.
JAMES R. McNESBY.

REFERENCES CITED

The following references are of record in the file of this patent:

UNITED STATES PATENTS

| Number | Name | Date |
|---|---|---|
| 2,389,873 | Schiller | Nov. 27, 1945 |
| 2,445,770 | Fischer | July 27, 1948 |